(12) United States Patent
Shinohara et al.

(10) Patent No.: US 8,464,258 B2
(45) Date of Patent: Jun. 11, 2013

(54) VIRTUAL COMPUTER AND CPU ALLOCATION METHOD

(75) Inventors: Makiko Shinohara, Hadano (JP);
Shuhei Matsumoto, Yokohama (JP);
Hironori Inoue, Ebina (JP)

(73) Assignee: Hitachi, Ltd., Tokyo (JP)

( * ) Notice: Subject to any disclaimer, the term of this patent is extended or adjusted under 35 U.S.C. 154(b) by 262 days.

(21) Appl. No.: 13/094,467

(22) Filed: Apr. 26, 2011

(65) Prior Publication Data

US 2011/0302579 A1 Dec. 8, 2011

(30) Foreign Application Priority Data

Jun. 2, 2010 (JP) .................................. 2010-126431

(51) Int. Cl.
*G06F 9/455* (2006.01)
*G06F 9/46* (2006.01)

(52) U.S. Cl.
USPC ............................................. 718/1; 718/104

(58) Field of Classification Search
USPC ...................................................... 718/1, 104
See application file for complete search history.

(56) References Cited

U.S. PATENT DOCUMENTS 8,286,161 B2 * 10/2012 Togawa et al. .................... 718/1
2009/0055830 A1 * 2/2009 Gusler et al. .................. 718/104

FOREIGN PATENT DOCUMENTS

JP 06-103092 4/1994

* cited by examiner

*Primary Examiner* — Diem Cao
(74) *Attorney, Agent, or Firm* — Foley & Lardner LLP

(57) ABSTRACT

When the number of logical CPUs increases as the number of LPARs increases, a physical CPU amount which a hypervisor uses will increase and thus the physical CPU resource cannot be effectively utilized. Grouping of LPARs and physical CPUs is performed and a logical CPU to which a physical CPU is allocated is selected from logical CPUs of an LPAR within a group.

12 Claims, 13 Drawing Sheets

FIG.2

CPU GROUP MANAGEMENT TABLE (020)   INITIAL STATE

| CPU GROUP NUMBER i (021) | NUMBER OF PHYSICAL CPU (022) | NUMBER OF LOGICAL CPU (023) | GROUP SERVICE RATE (024) | GROUP SERVICE TIME (025) | LOGICAL CPU MANAGEMENT TABLE ADDRESS (026) |
|---|---|---|---|---|---|
| 0 | 0 | 0 | 0 | 0 | 0x00567000 |
| 1 | 0 | 0 | 0 | 0 | 0x00589000 |

FIG.3

PHYSICAL CPU MANAGEMENT TABLE (030)   INITIAL STATE

| PHYSICAL CPU NUMBER (031) | CPU GROUP NUMBER ii (032) |
|---|---|
| 0 | -1 (UNDEFINED) |
| 1 | -1 (UNDEFINED) |
| 2 | -1 (UNDEFINED) |
| 3 | -1 (UNDEFINED) |
| 4 | -1 (UNDEFINED) |

FIG.4

LPAR MANAGEMENT TABLE (040)   INITIAL STATE

| LPAR NUMBER i (041) | NUMBER OF LOGICAL CPU ii (042) | CPU GROUP NUMBER iii (043) | LPAR SERVICE TIME (044) |
|---|---|---|---|
| 1 | 0 | -1 (UNDEFINED) | 0 |
| 2 | 0 | -1 (UNDEFINED) | 0 |
| 3 | 0 | -1 (UNDEFINED) | 0 |
| 4 | 0 | -1 (UNDEFINED) | 0 |

FIG.5

LOGICAL CPU MANAGEMENT TABLE (050)   INITIAL STATE

CPU GROUP 0

| ADDRESS | LPAR NUMBER ii (051) | LOGICAL CPU NUMBER (052) | LOGICAL CPU NUMBER (053) | ACTIVATION START TIME (054) | ACTIVATION COMPLETION TIME (055) |
|---|---|---|---|---|---|
| 0x00567000 | -1 (UNDEFINED) | -1 (UNDEFINED) | -1 (UNDEFINED) | 000,000 | 000,000 |

CPU GROUP 1

| ADDRESS | LPAR NUMBER ii (051) | LOGICAL CPU NUMBER (052) | LOGICAL CPU NUMBER (053) | ACTIVATION START TIME (054) | ACTIVATION COMPLETION TIME (055) |
|---|---|---|---|---|---|
| 0x00589000 | -1 (UNDEFINED) | -1 (UNDEFINED) | -1 (UNDEFINED) | 000,000 | 000,000 |

FIG.6

Physical CPU Group Configuration

| | | | | | |
|---|---|---|---|---|---|
| Group# | 0 | 1 | | | ~061 |
| Num P-CPU | 2 | 2 | | | ~062 |
| SRV | 65 | 35 | | | ~063 |

Physical CPU Configuration

| | | | | | | |
|---|---|---|---|---|---|---|
| P-CPU # | 0 | 1 | 2 | 3 | 4 | ~064 |
| Blade# | 1 | 1 | 1 | 1 | 1 | |
| Die# | 0 | 0 | 0 | 0 | 1 | |
| Core# | 0 | 1 | 2 | 3 | 0 | |
| Thread# | 0 | 0 | 0 | 0 | 0 | |
| Group# | 0 | 0 | 1 | 1 | * | ~065 |
| Schedule | D | D | S | S | S | |
| Status | HIG | HIG | HIG | HIG | HIG | |
| Freq (GHz) | 1.6 | 1.6 | 1.6 | 1.6 | 1.6 | |

FIG.7

CPU GROUP MANAGEMENT TABLE (020)

| 021 | 022 | 023 | 024 | 025 | 026 |
|---|---|---|---|---|---|
| CPU GROUP NUMBER i | NUMBER OF PHYSICAL CPU | NUMBER OF LOGICAL CPU | GROUP SERVICE RATE | GROUP SERVICE TIME | LOGICAL CPU MANAGEMENT TABLE ADDRESS |
| 0 | 0→2 | 0 | 0→65 | 0 | 0x00567000 |
| 1 | 0→2 | 0 | 0→35 | 0 | 0x00589000 |

FIG.8

PHYSICAL CPU MANAGEMENT TABLE (030)

| 031 | 032 |
|---|---|
| PHYSICAL CPU NUMBER | CPU GROUP NUMBER ii |
| 0 | -1 (UNDEFINED)→0 |
| 1 | -1 (UNDEFINED)→0 |
| 2 | -1 (UNDEFINED)→1 |
| 3 | -1 (UNDEFINED)→1 |
| 4 | -1 (UNDEFINED) |

FIG.9

```
-Logical Partition(LPAR) Configuration (DBG-n)-----------------------------
 # Name   Sta  Grp Pro Shr Ded Srv  Mem  VN ID AA AC PC VC PB
 1 LPAR1  Dea   0   2   2   0  65  1024   2  Y  *  N  *  Y BIOS
 2 LPAR2  Dea   0   2   2   0  35  1024   2  Y  *  N  N  Y BIOS
 3 LPAR3  Dea   1   2   2   0  85  2048   2  Y  *  N  N  Y BIOS
 4 LPAR4  Dea   1   2   2   0  15  1024   2  Y  *  N  N  Y BIOS
 5
 6  ~071
 7       072 073
 8
 9
10
                                      [PageUp]: Page Up / [PageDoown]: Page Doown
-Logical Information----------------    -Physical Information----------
           Pro Shr Ded    Mem   VN      User Memory   :  4864 MB
Assign Total 22  18   4   10240 14      Processors    :  8 (8)
Act Total     8   6   2    4096  6      Shared        :  6
Remain                      768         Dedicate      :  2

The power status: 'Dea' (Deactivated: power-off) , or 'Act' (Activated: power-on)
F2: Mem Alloc Dsp  F3: Act  F4: Dead  F5: React  F6: Add  F7: Remove   Esc: Menu
```

FIG.10

| LPAR MANAGEMENT TABLE (040) | | | |
|---|---|---|---|
| 041 | 042 | 043 | 044 |
| LPAR NUMBER i | NUMBER OF LOGICAL CPU ii | CPU GROUP NUMBER iii | LPAR SERVICE TIME |
| 1 | 0→2 | -1 (UNDEFINED)→0 | 0 |
| 2 | 0→2 | -1 (UNDEFINED)→0 | 0 |
| 3 | 0→2 | -1 (UNDEFINED)→1 | 0 |
| 4 | 0→2 | -1 (UNDEFINED)→1 | 0 |

FIG.11

| CPU GROUP 0 ADDRESS | 051 LPAR NUMBER ii | 052 LOGICAL CPU NUMBER | 053 LOGICAL CPU STATE | 054 ACTIVATION START TIME | 055 ACTIVATION COMPLETION TIME |
|---|---|---|---|---|---|
| 0x00567000 | -1 (UNDEFINED) → 1 | -1 (UNDEFINED) → 0 | -1 (UNDEFINED) → 2 | 000,000 | 000,000 |
| | -1 (UNDEFINED) → 1 | -1 (UNDEFINED) → 1 | -1 (UNDEFINED) → 2 | 000,000 | 000,000 |
| | -1 (UNDEFINED) → 2 | -1 (UNDEFINED) → 0 | -1 (UNDEFINED) → 2 | 000,000 | 000,000 |
| | -1 (UNDEFINED) → 2 | -1 (UNDEFINED) → 1 | -1 (UNDEFINED) → 2 | 000,000 | 000,000 |

| CPU GROUP 1 ADDRESS | 051 LPAR NUMBER ii | 052 LOGICAL CPU NUMBER | 053 LOGICAL CPU STATE | 054 ACTIVATION START TIME | 055 ACTIVATION COMPLETION TIME |
|---|---|---|---|---|---|
| 0x00589000 | -1 (UNDEFINED) → 3 | -1 (UNDEFINED) → 0 | -1 (UNDEFINED) → 2 | 000,000 | 000,000 |
| | -1 (UNDEFINED) → 3 | -1 (UNDEFINED) → 1 | -1 (UNDEFINED) → 2 | 000,000 | 000,000 |
| | -1 (UNDEFINED) → 4 | -1 (UNDEFINED) → 0 | -1 (UNDEFINED) → 2 | 000,000 | 000,000 |
| | -1 (UNDEFINED) → 4 | -1 (UNDEFINED) → 1 | -1 (UNDEFINED) → 2 | 000,000 | 000,000 |

FIG.12

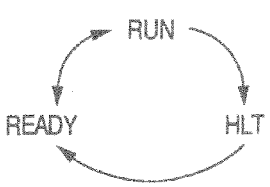

LOGICAL CPU STATE CODE AND STATE TRANSITION

| CODE | LOGICAL CPU STATE |
|---|---|
| 1 | RUN |
| 2 | READY |
| 3 | HLT |

FIG.15

| CORRESPONDENCE TABLE BETWEEN LOGICAL CPU TERMINATION CAUSE CODE AND LOGICAL CPU STATE | | |
|---|---|---|
| CAUSE CODE | CAUSE | LOGICAL CPU STATE |
| 0x000~0x00F | TIMER AND I/O INTERRUPT | READY |
| 0x010~0x01F | HYPERVISOR CALL | RUN |
| 0x010~0x02F | PROGRAM EXCEPTION | RUN |
| 0x030 | HALT INSTRUCTION | HALT |

FIG. 17

CALCULATION FORMULA OF GROUP SERVICE RATE ACTUAL VALUE $$\text{GROUP SERVICE RATE ACTUAL VALUE} = \frac{\text{GROUP SERVICE TIME OF ENTRY OF CPU GROUP MANAGEMENT TABLE}}{(\text{SERVICE TIME MONITORING INTERVAL} \times \text{NUMBER OF PHYSICAL CPU OF ENTRY OF CPU GROUP MANAGEMENT TABLE})}$$

FIG. 18

CALCULATION FORMULA OF PREDICTED GROUP SERVICE RATE ACTUAL VALUE $$\text{PREDICTED GROUP SERVICE RATE ACTUAL VALUE} = \frac{\text{GROUP SERVICE TIME OF ENTRY OF CPU GROUP MANAGEMENT TABLE}}{(\text{SERVICE TIME MONITORING INTERVAL} \times (\text{NUMBER OF PHYSICAL CPU OF ENTRY OF CPU GROUP MANAGEMENT TABLE} - 1))}$$

US 8,464,258 B2

VIRTUAL COMPUTER AND CPU ALLOCATION METHOD

INCORPORATION BY REFERENCE

The present application claims priority from Japanese application JP2010-126431 filed on Jun. 2, 2010, the content of which is hereby incorporated by reference into this application.

BACKGROUND OF THE INVENTION

The present invention relates to virtual computers, and a CPU allocation method in sharing and operating a plurality of logical CPUs in a time division manner on one physical CPU.

A virtual computer system divides or shares the physical computer resources, such as a CPU, a memory, and an I/O, of a physical computer by a hypervisor, and allocates the divided or shared physical computer resources to a plurality of logical partitions (LPARs), and independently operates an OS on each LPAR, respectively. The OS operating on each LPAR is referred to as a guest OS, and a program operating on the LPAR, including a host program controlled by the guest OS, is referred to as a guest program. On the other hand, the OS operating in a real computer is referred to as a basic OS.

A physical CPU resource allocated to an LPAR is referred to a logical CPU of the LPAR.

The guest OS operates completely similarly to the basic OS in terms of logical operations, but may be inferior in performance as compared with the basic OS due to the characteristics of dividing or sharing the physical computer resources.

On the other hand, the physical computer resource can be effectively utilized by allocating a physical computer resource, which a certain guest OS is currently not using, to other guest OS requiring the physical computer resource.

SUMMARY OF THE INVENTION

In the conventional art, when physical CPUs are shared, all the physical CPUs in a share mode are controlled to be shared among all the LPARs. For this reason, when the number of logical CPUs increases as the number of LPARs increases, the scheduling overhead due to the logical CPU search and selection process performed by a hypervisor will increase, so that the physical CPU amount which the hypervisor uses will increase and the physical CPU resource cannot be effectively utilized.

A concept "CPU group" is introduced and the CPU group is allocated to LPARs and physical CPUs, so that the grouping of LPARs, logical CPUs, and physical CPUs is performed, whereby the logical CPUs to which a physical CPU is allocated are limited to the logical CPUs of an LPAR within the same group. Furthermore, a group service rate actual measurement value indicating how much % of the whole physical CPU time of the system has been allocated to a CPU group is calculated, and then how much % of the whole physical CPU time of the system is allocated to the CPU group is compared with a group service rate specified by an operator. Thereby, whether the allocation of the physical CPU resource in the CPU group is sufficient or insufficient is determined, and a physical CPU is released from a certain CPU group having an excessive physical CPU resource and is added to other CPU group having an insufficient physical CPU resource. Such a dynamic change in the CPU group configuration is easily made just by changing a CPU group number in a management table.

According to the present invention, the scheduling overhead of a hypervisor due to the logical CPU search and selection process performed by the hypervisor can be reduced and the physical CPU resource can be effectively utilized.

Furthermore, according to the present invention, the cases can be handled where the physical CPU resource runs short due to, for example, an abrupt increase in the size of a guest program to execute.

Other objects, features and advantages of the invention will become apparent from the following description of the embodiments of the invention taken in conjunction with the accompanying drawings.

BRIEF DESCRIPTION OF THE DRAWINGS

FIG. 2 shows the initial state of a table for managing CPU groups.

FIG. 3 shows the initial state of a table for managing physical CPUs.

FIG. 4 shows the initial state of a table for managing LPARs.

FIG. 5 shows the initial state of a table for managing logical CPUs.

FIG. 6 shows a screen for displaying and setting the configuration of CPU groups and physical CPUs.

FIG. 7 shows the CPU group management table reflecting the setting of FIG. 6.

FIG. 8 shows the physical CPU management table reflecting the setting of FIG. 6.

FIG. 9 shows a screen for displaying and setting the configuration of LPARs.

FIG. 10 shows the LPAR management table reflecting the setting of FIG. 9.

FIG. 11 shows the logical CPU management table after activating LPARs.

FIG. 12 shows logical CPU state codes and state transition.

FIG. 15 shows logical CPU termination cause codes and logical CPU states.

FIG. 17 shows a calculation formula of a group service rate actual measurement value.

FIG. 18 shows a calculation formula of a predicted group service rate.

DETAILED DESCRIPTION OF THE EMBODIMENTS

Hereinafter, examples, to which the present invention is applied, are described with reference to the accompanying drawings.

Figure 1:
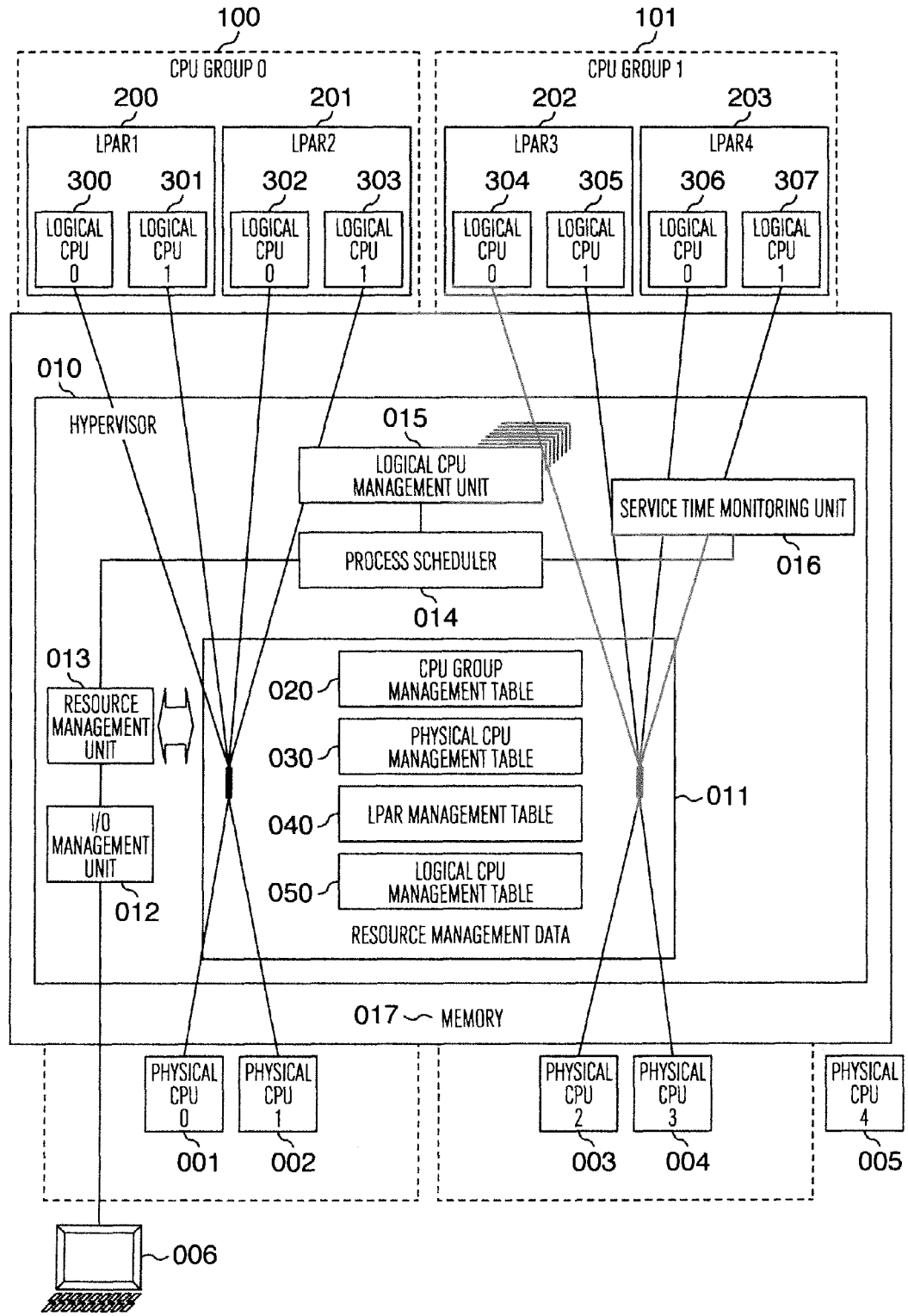
FIG. 1 is an explanatory view showing a basic configuration example of a virtual computer system according to the present invention.

FIG. 1 is an explanatory view showing a basic configuration example of a virtual computer system according to the present invention.

The computer includes physical CPUs (001-005), a memory 017, and a function to connect to an I/O device (006). A hypervisor (010) arranged in a part of the memory of this computer divides or shares the computer resources, such as the CPUs, memory, and I/O device, and allocates these resources to LPARs which are logical computers to generate and control one or more logical computers.

The hypervisor comprises: resource management data (011) for managing physical and logical computer resources; an I/O management unit (012) managing the input/output to/from an operator; a resource management unit (013) managing the resource management data; a logical CPU management unit (015) in one-to-one correspondence with a logical CPU, the logical CPU management unit being realized by a logical CPU process of associating a logical CPU resource with a physical CPU resource; a service time monitoring unit (016) realized by a service time monitoring process of monitoring a service time which is an allocation time of a physical CPU for a logical CPU; and a process scheduler (014) controlling a schedule of the logical CPU process and service time monitoring process.

The resource management data (011) has arranged therein a CPU group management table (020), a physical CPU management table (030), an LPAR management table (040), and a logical CPU management table (050) with the respective configurations shown in FIG. 2, FIG. 3, FIG. 4, and FIG. 5.

The maximum number of LPARs on the hypervisor and the maximum number of logical CPUs constituting the LPAR are determined by the maximum numbers defined by the system, respectively. In this explanatory view, a configuration is taken, as an example, wherein there are four LPARs (200-203); i.e. four logical computers, on the hypervisor, and wherein the respective LPARs comprise two logical CPUs (300-307).

A CPU group 0 (100) is allocated to the physical CPUs (001-002) and LPARs (200-201), while a CPU group 1 (101) is allocated to the physical CPUs (003-004) and LPARs (202-203).

The CPU group management table (020) shown in FIG. 2 comprises, a CPU group number i (021) which is an identifier of the CPU group; the number of physical CPUs (022) indicative of the number of physical CPUs to which a CPU group is allocated; the number of logical CPUs i (023) indicative of a total value of the numbers of logical CPUs of an LPAR to which a CPU group is allocated; a group service rate (024); a group service time (025) indicative of a total physical CPU time which the LPAR utilizes; and a logical CPU management table address (026) in which an address on the memory of the logical CPU management table (050) defined for each group is held. In the CPU group management table (020), the same number of entries as the maximum number of CPU groups defined by the system, the each entry being for storing the data 022-026 related to a CPU group number, are defined.

Here, the group service rate (024) indicates a relative allocation for each group of the physical CPU time which one or more LPARs to which a CPU group has been allocated utilize. Moreover, the group service rate (024) is also a user setting value to specify "how much % of the whole physical CPU time of the system is allocated for each CPU group."

In FIG. 2, the maximum number of CPU groups is 2. In the initial state where any CPU group has not been allocated to any physical CPU or LP the hypervisor sets the values of FIG. 2.

The physical CPU management table (030) shown in FIG. 3 includes a physical CPU number (031) which is an identifier of a physical CPU, and a CPU group number ii (032) which is allocated to the physical CPU by the operation of an operator.

The physical CPU management table (030) has the same number of entries as the number of physical CPUs constituting the system: In FIG. 3, the number of physical CPUs is 5. In the initial state where any CPU group has not been allocated, the hypervisor sets the values of FIG. 3.

The LPAR management table (040) shown in FIG. 4 includes an LPAR number i (041) indicative of the identifier of an LPAR, the number of logical CPUs ii (042) indicative of the number of logical CPUs defined in the LPAR, a CPU group number iii (043) allocated to the LPAR, and an LPAR service time (044) indicative of a total physical CPU time allocated to the LPAR.

The LPAR management table (040) has the same number of entries as the maximum number of LPARs defined by the system. The number of logical CPUs ii (041) and the CPU group number iii (043) are defined by the operation of an operator. In FIG. 4, the maximum number of LPARs is 4. In the initial state before the operation of an operator is performed, the hypervisor sets the values of FIG. 4.

The logical CPU management table (050) shown in FIG. 5 includes: an LPAR number ii (051) indicative of the number of an LP to which a logical CPU belongs; a logical CPU number (052) which is an identifier within the LPAR of the logical CPU; a logical CPU state (053) indicative of the state of the logical CPU; an activation start time (054) in which a timer value indicative of a time when the logical CPU has been activated is set; and an activation completion time (055) in which a timer value indicative of a time when a guest mode transitions to a hypervisor mode and the logical CPU operation completes is set.

Each entry of the logical CPU management table (050) is defined according to the number of logical CPUs ii (042) defined in the LPAR management table (040), when the LPAR is activated. In the initial state where there is no activated LPAR, the hypervisor sets the values of FIG. 5.

FIG. 6 shows an example of a screen for changing and verifying the configuration of physical CPUs. FIG. 9 shows an example of a screen for changing and verifying the configuration of LPARs. By transmitting and receiving data between the I/O device (006) and resource management data (011) via the I/O control unit (012) and resource management unit (013) of the hypervisor, the definition content of the resource management data (011) is displayed on the screen and the modification from the screen is reflected on the resource management data (011).

A group # field (061) of a physical CPU group configuration block of FIG. 6 displays the same number of CPU group numbers as the maximum number of CPU groups defined by the system, the CPU group number being the identifier of a CPU group. In FIG. 6, the maximum number of CPU groups is two, and 0 and 1 are displayed in this field.

A Num P-CPU field (062) is the field for setting and displaying the number of physical CPUs to which a CPU group is allocated. FIG. 6 shows a situation where the number of physical CPUs to which the CPU group 0 is allocated has been set to two and the number of physical CPUs to which the CPU group 1 is allocated has been set to two.

An SRV field (063) is the field for setting and displaying the service rate of a CPU group. FIG. 6 shows a situation where the service rate of the CPU 0 group has been set to 65 and the service rate of the CPU 1 group has been set to 35.

The Physical CPU Configuration block of FIG. 6 displays a result of the resource management unit (013) having allocated CPU groups to physical CPUs when the number of physical CPUs has been set to the Num P-CPU field (062). A P-CPU# field (064) displays the physical CPU number, and a Group # field (065) displays CPU groups which are allocated to physical CPUs. Here, the modification by an operator is also accepted. FIG. 6 shows a situation where the CPU group 0 is allocated to the physical CPUs 0, 1, the CPU group 1 is allocated to the physical CUPs 2, 3, and no CPU group is allocated to the physical CPU 4.

FIG. 7 and FIG. 8 respectively show the change in each set value of the CPU group management table (020) and physical CPU management table (030) after the configuration change is made from the initial state of the hypervisor to the situation shown in FIG. 6.

A # field (071) of FIG. 9 display the LP number. A Grp field (072) is the field for changing and displaying the CPU group number allocated to LPARs, and a Pro field (073) is the field for changing and displaying the number of logical CPUs constituting the LPAR. FIG. 9 shows a situation after the CPU group to be allocated to LPARs 1, 2 has been set to the CPU group 0, the CPU group to be allocated to LPARs 3, 4 has been set to the CPU group 1, and the number of logical CPUs constituting each LP has been set to 2.

FIG. 10 shows the change in each set value of the LP management table (030) after a configuration change is made from the initial state of the hypervisor to the situation shown in FIG. 9.

FIG. 11 shows the changes in the logical CPU management table (050) after sequentially activating LPARs 1, 2, 3, and 4 in the situation of FIG. 9. In a logical CPU state (053), "2" which is the code indicative of READY is set. In a logical CPU number (052), an identifier (0 or 1 in this example) within an LPAR of a logical CPU is set.

FIG. 12 shows a correspondence between a logical CPU state code and a logical CPU state, and a state transition. RUN indicates a state where a physical CPU is already allocated. READY indicates a "physical CPU allocation waiting state" which changes to RUN if a physical CPU is allocated by the process scheduler (014). HLT indicates a state where the operation of a logical CPU is temporarily stopped by the guest OS.

When the process scheduler (014) has allocated a physical CPU to a logical CPU and the guest program is ready to operate, the logical CPU state is changed from READY to RUN.

Figure 13:
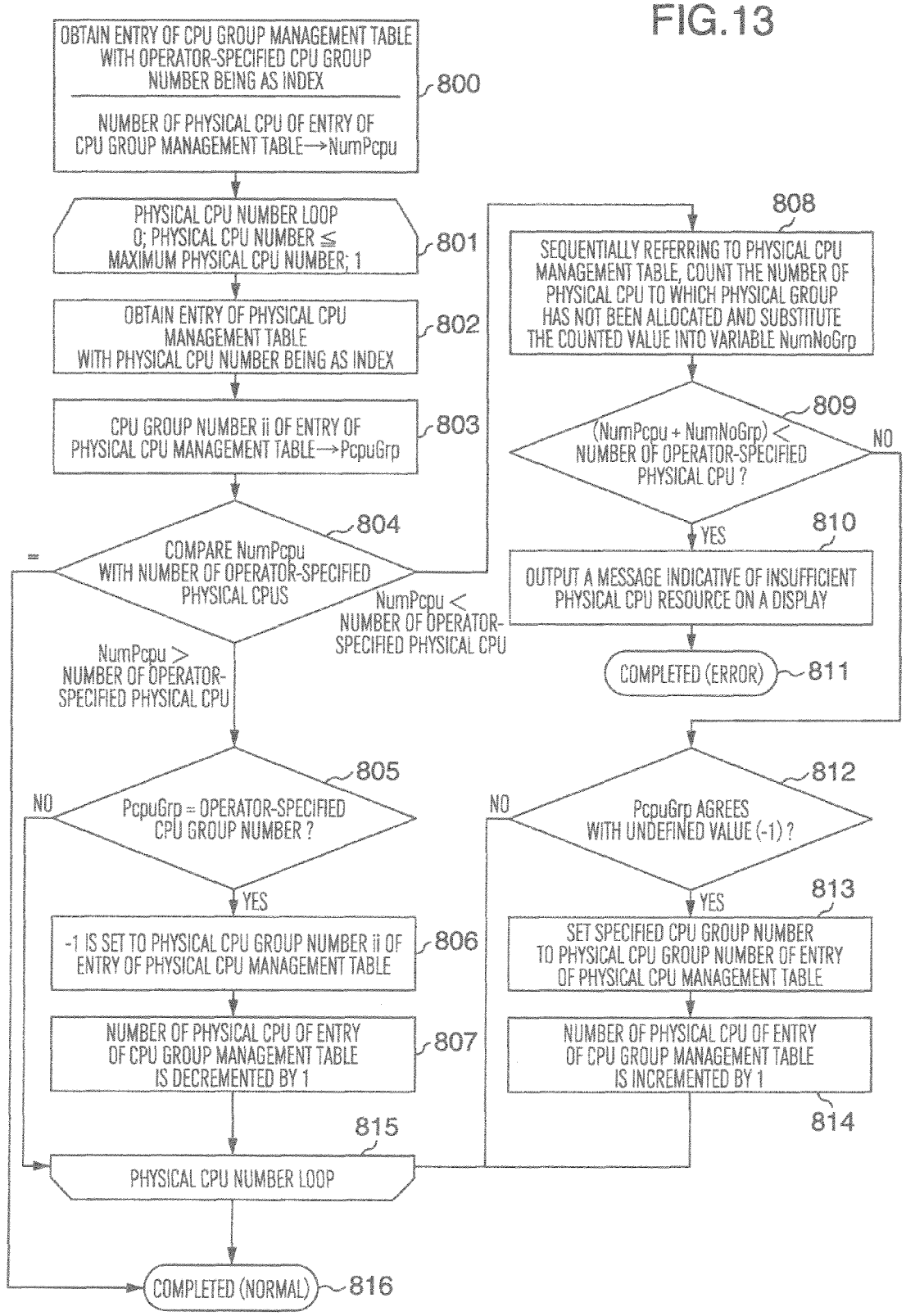
FIG. 13 shows a processing procedure to associate physical CPUs with CPU groups.

FIG. 13 shows a process of allocating a CPU group to a physical CPU, which the resource management unit (013) executes when the Num P-CPU field (062) of the hypervisor screen has been changed by an operator. Hereinafter, with the setting value of the Num P-CPU field (062) being as an operator-specified number of physical CPUs and with the CPU group number (061) corresponding to the Num P-CPU field being as an operator-specified CPU group number, this processing procedure is shown.

With the operator-specified CPU group number being as an index, an entry of the CPU group management table (020) is obtained, and the number of physical CPUs (022) of the CPU group management table is substituted into the temporary variable Num P-cpu used for processing (Process 800).

Sequentially referring to the physical CPU management table (030) from the top thereof (Processes 801, 802), Processes 803-813 are executed for the entry of the physical CPU management table (030).

The CPU group number ii (032) of the entry of the physical CPU management table (030) is substituted into the temporary variable PcpuGrp used for processing (Process 803), and NumPcpu is compared with the operator-specified number of physical CPUs (Process 804).

When NumPcpu agrees with the operator-specified number of physical CPUs in Process 804, the processing procedure is completed (Process 804→Process 816).

When NumPcpu is greater than the operator-specified number of physical CPUs in Process 804, Processes 805-807 will be executed.

When NumPcpu is smaller than the operator-specified number of physical CPUs in Process 804, Processes 808-814 will be executed.

First, Processes 805-807 when NumPcpu is smaller than the operator-specified number of physical CPUs are described.

PcpuGrp is compared with the operator-specified CPU group number (Process 805).

When PcpuGrp agrees with the operator-specified CPU group number, "−1" indicative of "undefined" is set to the CPU group number ii (032) of the entry of the physical CPU management table (030) (Process 806), and the number of physical CPUs of the entry of the CPU group management table (020) is decremented by 1 (Process 807). For example, when NumPcpu is 3 and the operator-specified physical CPU number is 1, a physical CPU number loop (Processes 801-815) is executed two times and the process of decrementing the number of physical CPUs of the CPU group management table by 1 is executed two times, and at the end of the execution, the number of physical CPUs of the CPU group management table becomes 1 which is the operator-specified number of physical CPUs.

When PcpuGrp does not agree with the operator-specified CPU group number, the processing procedure transitions to the process for the next physical CPU number (Process 805→Process 815).

Next, Processes 808-814 when NumPcpu is smaller than the operator-specified number of physical CPUs in Process 804 are described.

Sequentially referring to the physical CPU management table (030), the number of physical CPUs to which any CPU group has not been allocated yet is counted and the counted number is substituted into the temporary variable NumNoGrp used for processing (Process 808).

(NumPcpu+NumNogrp) is compared with the operator-specified number of physical CPUs (Process 809).

When the operator-specified number of physical CPUs is greater than (NumPcpu+NumNogrp), the physical CPU resource is insufficient for the specified value and therefore a message indicative of this fact is output to alert the operator (Process 810), and the processing procedure is halted (Process 811).

When the operator-specified number of physical CPUs is small than or equal to (NumPcpu+NumNogrp), PcpuGrp into which the CPU group number ii (032) of the entry of the physical CPU management table (030) has been substituted is compared with the undefined value "−1" (Process 812).

If PcpuGrp agrees with the undefined value "−1" as a result of the comparison in Process 812, the operator-specified CPU group number is set to the physical CPU group number ii (032) of the entry of the physical CPU management table (030) (Process 813) and the number of physical CPUs (022) of the entry of the CPU group management table (020) is incremented by 1 (Process 814).

If PcpuGrp disagrees with the undefined value "−1" as a result of the comparison in Process 812, the processing procedure transitions to the process for the next physical CPU number (Process 812→Process 815).

This flow shows an example in which the CPU group number ii (032) of the entry of the physical CPU management table (030) is set according to the operator-specified number of physical CPUs so as to change the allocation of a CPU group to a physical CPU. Note that, when an operator has changed the allocation of a CPU group (065) to a physical CPU number (064) of FIG. 6, a process may be performed in which with the physical CPU number (064) being as an index, the entry of the physical CPU management table (030) is obtained and the value of the CPU group number (065) is set to the entry of this table.

Figure 14:
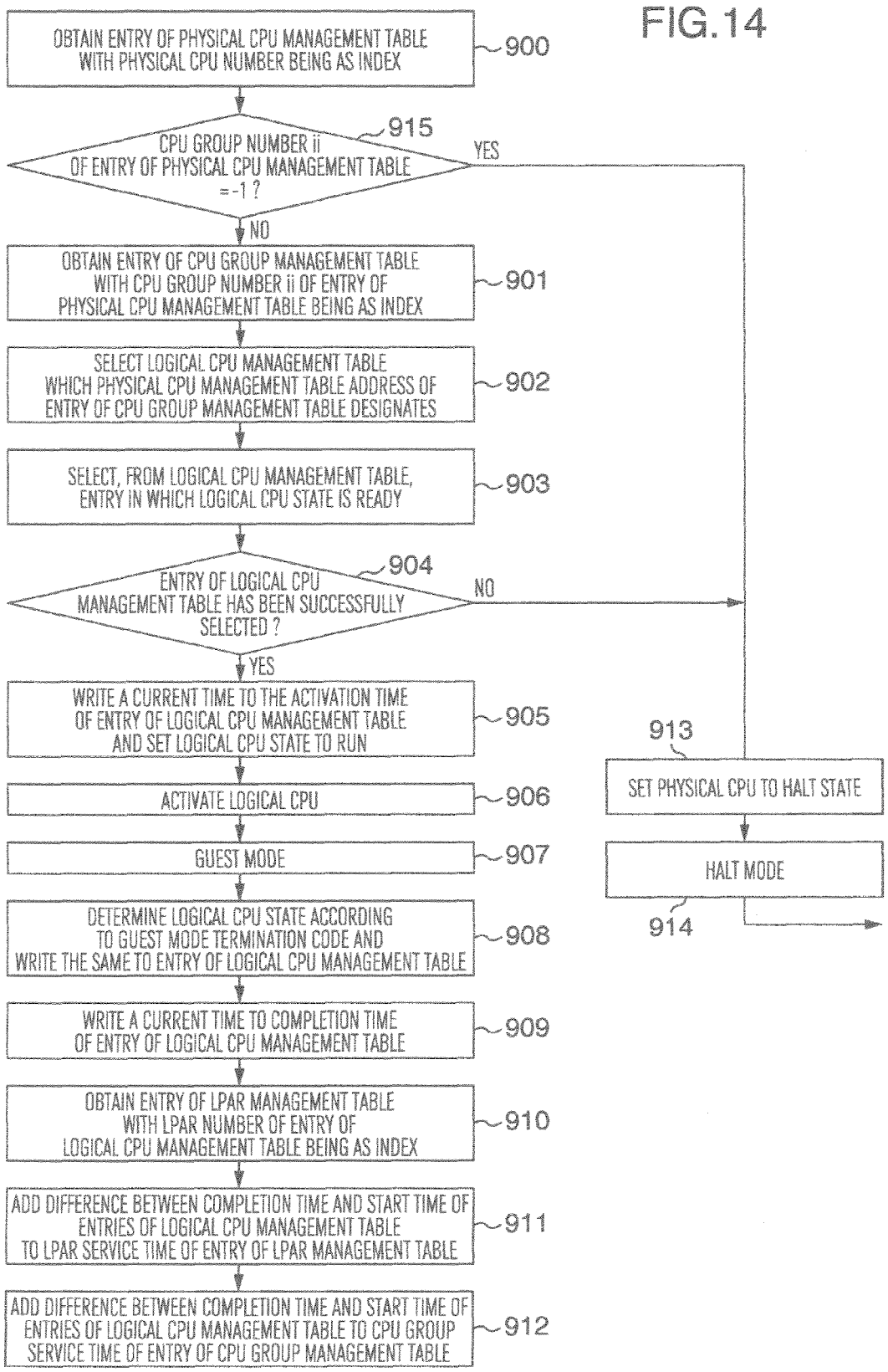
FIG. 14 shows a processing procedure when a logical CPU is activated and terminated.

FIG. 14 shows a process of allocating a physical CPU to a logical CPU performed by the process scheduler (014). After being expanded on the memory and completing the hypervisor initialization process, the process scheduler (014) starts to operate on all the physical CPUs.

With a physical CPU number which is the identifier of a currently-operating physical CPU being as the index, the process scheduler (014) obtains an entry of the physical CPU management table (030) (Process 900).

Next, it is determined whether the CPU group number ii (032) of the entry of the physical CPU management table (030) is the undefined value "−1" (Process 915).

When the CPU group number ii (032) is the undefined value "−1" in Process 915, the physical CPU is set to a halt state (Processes 913, 914) to halt the processing procedure.

When the CPU group number ii (032) is not the undefined value "−1" in Process 915, an entry of the CPU group management table (020) is obtained, with the CPU group number ii (032) being as the index (Process 901).

Next, with the use of the logical CPU management table address (026) of the entry of the CPU group management table (020), the logical CPU management table is referred to (Process 902).

Next, from the logical CPU management table (050) currently referred to, an entry of the logical CPU management table (050) in which the logical CPU state (053) is READY is selected (Process 903).

The process scheduler (014) determines whether or not the entry of the logical CPU management table (050) has been successfully selected (Process 904).

When the process scheduler (014) determines in Process 904 that the selection of the entry failed, the physical CPU is set to the halt state (Processes 913, 914) to halt the processing procedure. Note that, if the halt state has been released due to the occurrence of an interrupt, the flow returns to the starting process (Process 900) of the scheduler to continue the physical CPU allocation process.

When the process scheduler (014) determines in Process 904 that the entry of the logical CPU management table (050) has been successfully selected, a time when the activation process 906 of the logical CPU is executed is written to the activation start time (054) of the entry of the logical CPU management table (050), and the logical CPU state (053) is set to RUN (Process 905) to activate the logical CPU (Process 906). Note that the physical CPU transitions to the guest mode in which an instruction of the guest OS is directly executed without involvement of the hypervisor (Process 907).

When the guest mode has been released due to the occurrence of an interrupt and the process scheduler (014) is activated again, the process scheduler (014) reads a guest mode termination cause code set in a hardware register.

According to a correspondence table of the logical CPU termination cause code and the logical CPU state, shown as an example in FIG. 15, which the hypervisor defined, the logical CPU state is determined and a logical CPU state code corresponding to the determined logical CPU state is written to the logical CPU state (053) (Process 908). Next, a time when the guest mode (Process 907) is completed is written to the activation completion time (055) of the entry of the logical CPU management table (050) (Process 909), and with the LPAR number of the entry of the logical CPU management table (050) being as an index, an entry of the LPAR management table (040) is obtained (Process 910).

Next, a difference between the activation completion time (055) and activation start time (054) of the entry of the logical CPU management table (050) is added to the LPAR service time (044) of the entry of the LPAR management table (040) (Process 911).

Furthermore, the difference between the activation completion time (055) and activation start time (054) of the entry of the logical CPU management table (050) is also added to the CPU group service time (025) of the entry of the CPU group management table (020) (Process 912).

Subsequently, the flow returns to the starting process (Process 900) of the scheduler to continue the processing procedure.

As described above, by setting a CPU group number to the CPU group number ii (032) of the physical CPU management table (030), the CPU group is allocated to a physical CPU, and then the logical CPU of an LPAR to which this CPU group has been allocated is registered in the logical CPU management table (050) for each CPU group. Then, from a group of logical CPUs registered in the logical CPU management table for each CPU group, the logical CPU to which the physical CPU is allocated is selected. In this manner, the grouping of physical CPUs and logical CPUs is performed. Thus, an effect of limiting logical CPUs, to which a physical CPU is allocated, to the logical CPUs of an LPAR within the same group can be obtained.

For example, when a large scale configuration, for example, in which the number of physical CPUs is 128, the number of logical CPUs per LPAR is 16, the number of LPARs is 16, and the number of logical CPUs of the whole system is 16×16=256, is grouped into 8 CPU groups each having the same number of physical CPUs and the same number of LPARs, then the number of physical CPUs, the number of LPARs, and the number of logical CPUs for each CPU group become 16 (=128/8), 2 (=16/8), and 32 (number of LPARs per logical CPU×number of LPARs=16×2), respectively.

In the process of allocating a physical CPU to logical CPUs, the number of target logical CPUs of the process of selecting logical CPUs activated in each physical CPU (FIG. 14), the process being performed by the process scheduler (014) operating in the physical CPU, becomes 256 (the number of all logical CPUs defined by the system) when the CPU grouping is not performed, while when the CPU grouping is performed this number becomes 32.

In the widely known linear search method, the average number of times of search when the number of data is n is n/2. Therefore, when the logical CPU search process in the process of allocating a physical CPU to logical CPUs is performed by the linear search, for example, the average number of times of search becomes 32/2=16 if 32 logical CPUs are grouped into one CPU group, as described above. In contrast, when the CPU grouping is not performed, the average number of times of search is 256/2=128. That is, by performing the CPU grouping, the time required for the logical CPU search process can be reduced to ⅛ as compared with the case where the CPU grouping is not performed.

Moreover, for example, when a guest OS used for actual operation is operated in LPARs 1-2 and a guest OS used for development is operated in LPARs 3-4, a different CPU group is allocated to LPARs 1-2 and LPARs 3-4, respectively. By allocating more physical CPUs to the CPU group in which the guest OS used for actual operation operates, the performance of the guest OS used for actual operation can be improved.

Figure 16A:
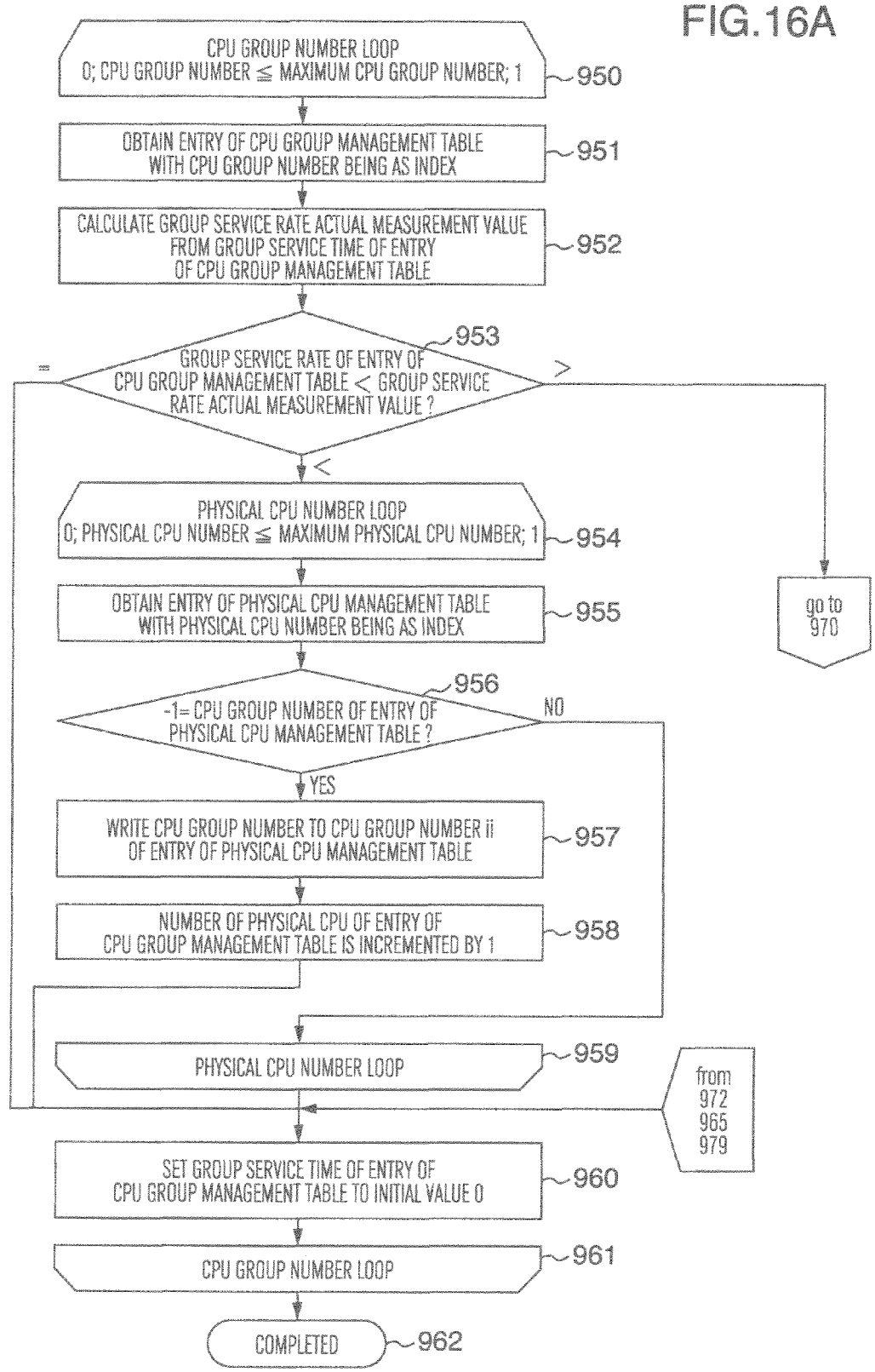
FIG. 16A show the first half of a processing procedure to increment/decrement the number of physical CPUs of a CPU group.
Figure 16B:
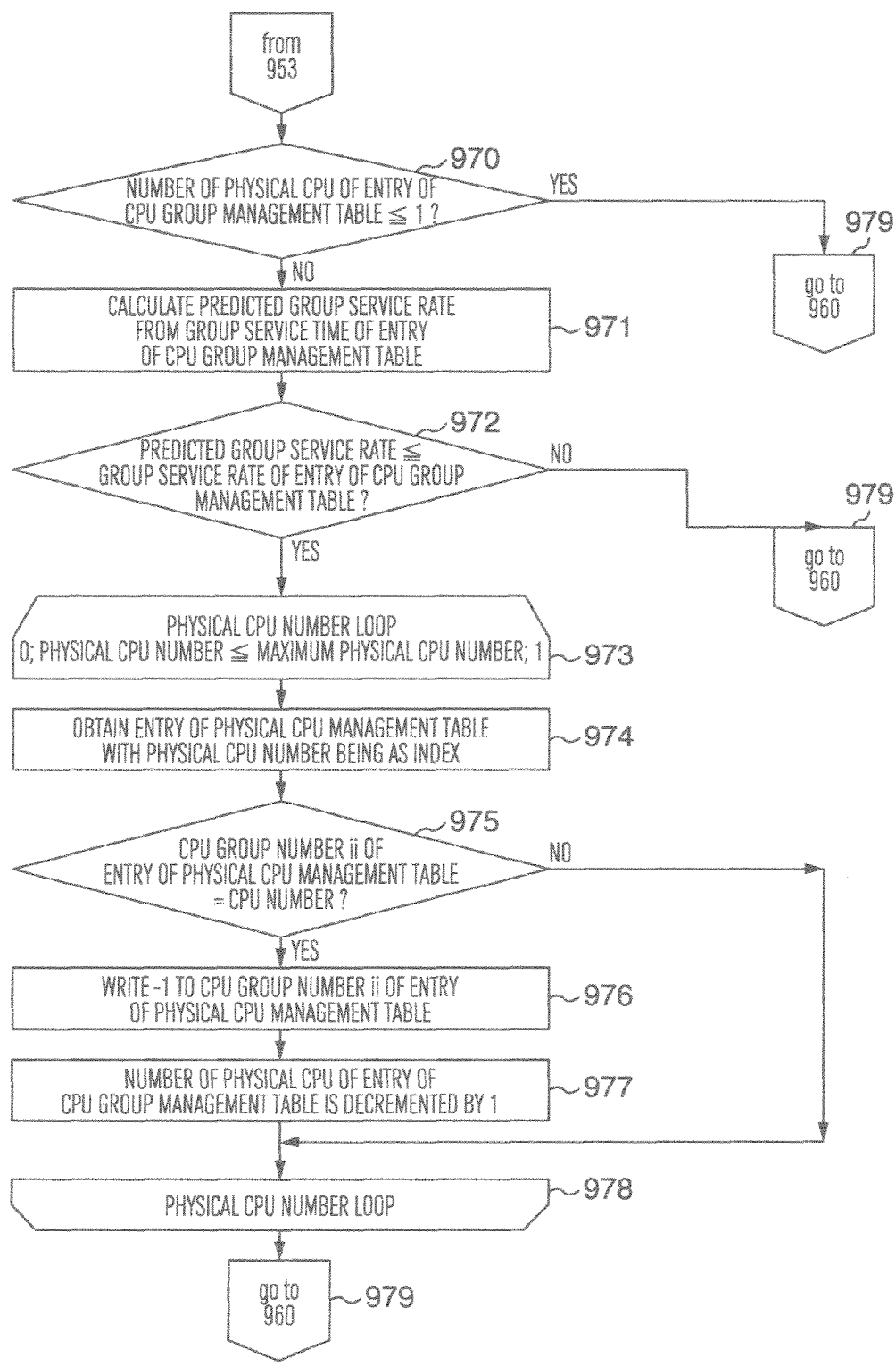
FIG. 16B show the latter half of the processing procedure to increment/decrement the number of physical CPUs of the CPU group.

FIGS. 16A, 16B shows the processing procedure of the service time monitoring unit. The service time monitoring unit is realized by executing a service time monitoring process operating at each service time monitoring interval determined by the hypervisor. The service time monitoring unit calculates the group service rate actual measurement value from the service time for each CPU group, and compares this value with a service rate, thereby determining whether the physical CPU resource of the group is sufficient or insufficient, and dynamically changing the CPU group allocated to physical CPUs.

Note that the group service rate actual measurement value is a measured value indicative of "how much % of the physical CPU time of the whole system has been allocated to a CPU group." Moreover, the service time monitoring interval is a "time interval at which the group service rate actual measurement value is calculated", and is the value determined by the hypervisor.

The service time monitoring unit refers to the CPU group management table (020) sequentially from the top thereof (Processes 950, 951) and executes the processing procedures of FIG. 16A and FIG. 16B with respect to the entry of the CPU group management table (020).

The service time monitoring unit calculates the group service rate actual measurement value according to a calculation formula shown in FIG. 17 (Process 952), and compares the group service rate (024) of the CPU group management table (020) with the group service rate actual measurement value (Process 953).

When in the comparison process 953, the group service rate (024) is equal to the group service rate actual measurement value, the service time monitoring unit executes the process of rewinding the group service time (025) of the entry of the CPU group management table (020) to the initial value 0 (Process 960) and executes a reference loop (Processes 950-961) of the entry of the CPU group management table (020) for the next CPU group number.

Note that the processing procedures of FIGS. 16A and 16B are executed at tune instances $t_0, t_1, t_2, \ldots, t_n, t_{n+1}$, at each service time monitoring intervals In the execution at $t_{n+1}$, the CPU service rate actual measurement value is calculated from the CPU time which has been allocated to each CPU group between $t_n$ and $t_{n+1}$, and therefore in the execution at $t_n$, the group service time is set to zero (Process 960). This is the "process of rewinding a group service time to the initial value 0" described above.

When the group service rate (024) is lower than the group service rate actual measurement value in the comparison process 953, the physical CPU resource is determined as insufficient and Processes 954-962 are executed.

When the group service rate (024) is higher than the group service rate actual measurement value in the comparison process 953, it is determined that there is a room in the physical CPU resource, and the service time monitoring unit executes the processing procedure of FIG. 16B.

First, Processes 954-962 when the group service rate (024) is lower than the group service rate actual measurement value in the comparison process 953 are described.

Sequentially referring to the entries of the physical CPU management table (030) (Processes 954, 955), the service time monitoring unit searches a physical CPU, the CPU group number ii (032) of which of the physical CPU management table (030) is "−1" indicative of the undefined value and to which any CPU group has not been allocated (Process 956).

As a result of the search of Process 956, when there is no physical CPU to which any CPU group has not been allocated, a reference loop (Processes 954-959) of the entry of the physical CPU management table (030) is executed for the next physical CPU number.

As a result of the search of Process 956, when there is a physical CPU to which any CPU group has not been allocated, the CPU group number is written to the CPU group number ii (032) of the entry of the physical CPU management table (030) (Process 957).

Then, the number of physical CPUs (022) of the entry of the CPU group management table (020) is incremented by 1 (Process 958).

Then, the reference loop of the entry of the physical CPU management table (030) is completed (Process 958→Process 960), and the group service time (025) of the entry of the CPU group management table (020) is rewound to the initial value 0 (Process 960).

Then, a reference loop (Processes 950-961) of the entry of the CPU group management table (020) is executed for the next CPU group number. Once the target CPU group number becomes greater than the maximum CPU group number, the flow gets out of this loop processing, and the processing procedure of the service time monitoring unit is completed (Process 962).

As described above, when the group service rate is lower than the group service rate actual measurement value, a physical CPU to which any CPU group has not been allocated is searched first. Then, in Process 958, this physical CPU is allocated to a CPU group whose group service rate is lower than the group service rate actual measurement value, and therefore the number of physical CPUs constituting the CPU group having a low group service rate will increase. As a result, the group service rate actual measurement value of the relevant CPU group decreases, and it is therefore possible to approach a predetermined group service rate.

Next, the processing procedure when the group service rate (024) is higher than the group service rate actual measurement value in the comparison process 953 is described using FIG. 16B.

When the number of physical CPUs is equal to or less than 1, if a process (Process 977) of decrementing the number of physical CPUs allocated to a CPU group is performed, the conditional determination 915 of the processing procedure of the process scheduler (FIG. 14) operating in a physical CPU to which the relevant CPU group has been allocated is always not satisfied and therefore there will be no case of branching to Process 901. In this case, a logical CPU of the LPAR to which the relevant CPU group has been allocated cannot be activated. Then, the number of physical CPUs (022) of the entry of the CPU group management table (020) is checked (Process 970). As a result of the check process 970, if the number of physical CPUs is equal to or less than 1, the reference loop (Processes 954-959) of the entry of the physical CPU management table (030) is completed and Process 960 is executed.

As a result of the check process 970, if the number of physical CPUs is equal to or greater than 2, Processes 971-978 are performed using the target entry of the physical CPU management table (030).

With the use of the group service time of the entry of the CPU group management table (020), a predicted group service rate is calculated according to a calculation formula shown in FIG. 18 (Process 971). Here, the predicted group service rate is a numerical value predicting the group service rate when the number of physical CPUs to which a CPU group is allocated has been decremented by 1.

Next, the predicted group service rate is compared with the group service rate.

As a result of the comparison process 972, when the predicted group service rate is higher than the group service rate, if the number of physical CPUs to which a CPU group is allocated is reduced, a physical CPU resource shortage will occur and therefore the flow will return to Process 960 without executing Processes 973-978 (Process 972→Process 960).

As a result of the comparison process 972, when the predicted group service rate is lower than or equal to the group service rate, even if the number of physical CPUs is decremented by 1, the group service rate actual measurement value will never exceed the group service rate. Then, the physical CPU management table (030) is sequentially searched to determine (Process 975) whether the CPU group number ii (032) of the entry of the physical CPU management table (030) agrees with the target CPU group number in the CPU group number loop (Processes 950-961), and if it does not agree with, the process for the next entry of the physical CPU management table (020) is performed (Process 975→Process 978).

In the determination process 975, if it is determined that the CPU group number ii (032) of the entry of the physical CPU management table (030) agrees with the target CPU group number in the CPU group number loop (Processes 950-961), then −1 indicative of "undefined" is written to the CPU group number ii (032) of the entry of the physical CPU management table (030) (Process 976), the number of physical CPUs (022) of the entry of the physical CPU group managing table (020) is decremented by 1 (Process 977), and the process for the next entry of the physical CPU management table (020) is performed (Process 978).

If the reference loop of the physical CPU management table is completed, the flow returns to Process 960 to perform the reference loop of the CPU groups reference table (Process 979→Process 960).

Figure 19:
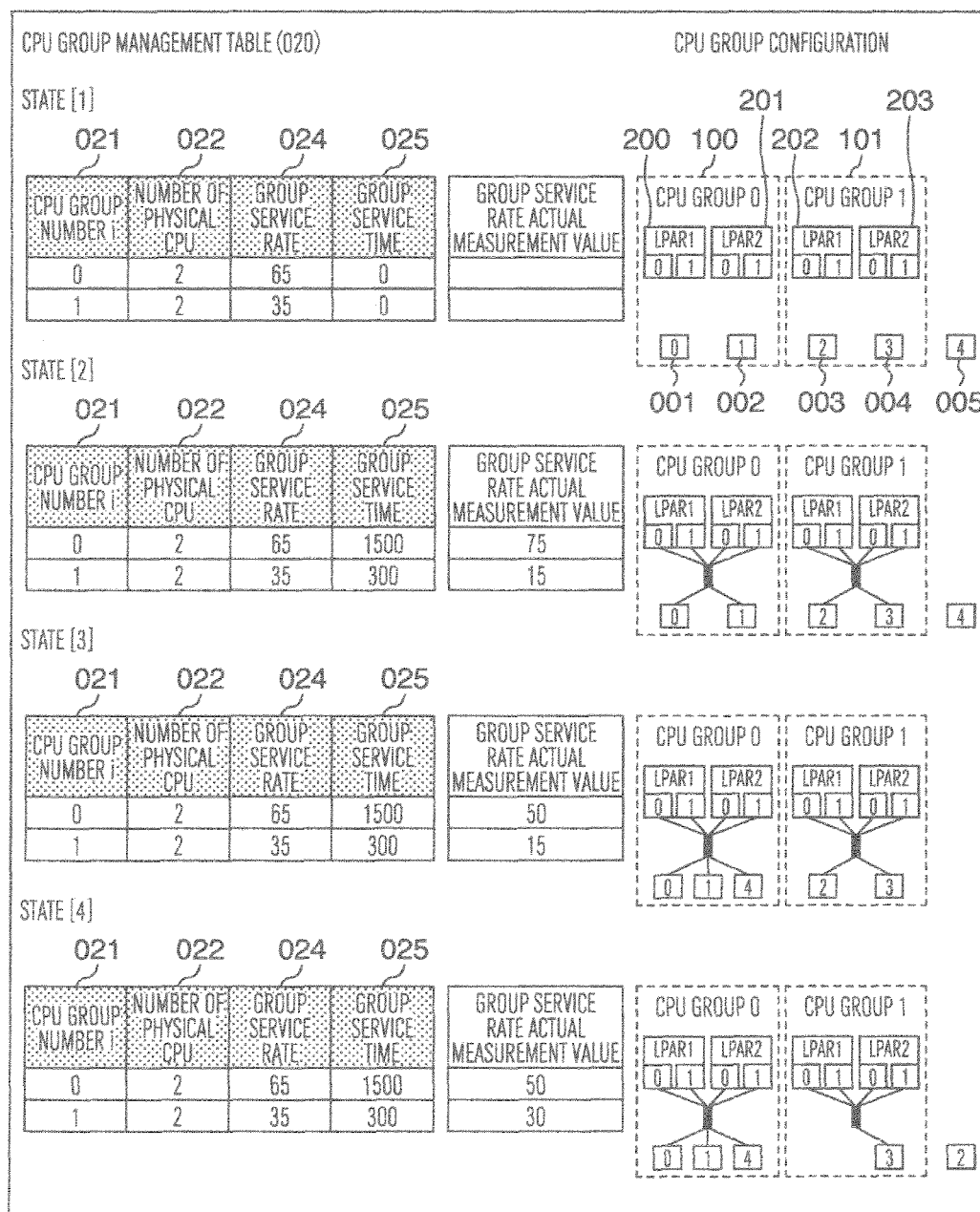
FIG. 19 shows an example of a dynamic change in a CPU group configuration.

FIG. 19 shows an example of the dynamic change in the CPU group configuration when the service time monitoring unit, which is realized by the service time monitoring process, executes the processing procedures shown in FIGS. 16A, 16B, in comparison with the change in the CPU group management table. In the CPU group management table of this view, the description on the number of logical CPUs (023) and the logical CPU management table address (026) are omitted.

State 1 shows the CPU group management table (020) and the CPU group configuration when these table and configuration are set to the state shown in FIG. 6 and FIG. 9 by an operator before activating an LPAR after the hypervisor is activated. Since the LPAR has not been activated, the correspondence between the physical CPUs (001-005) and logical CPUs is not established yet.

Upon activation of four LPARs (200-203), the process of allocating physical CPUs to logical CPUs is activated by the process scheduler (014) shown in FIG. 14. In this example, when the service time monitoring interval 1000 milliseconds has elapsed, the physical CPU allocation time for the CPU group 0 and CPU group 1 at the relevant interval becomes 2000 milliseconds (=1000 millisecond×2 (i.e., the number of physical CPUs of the CPU group)).

At this service time monitoring interval, when such a program of a load is operating that the logical CPU of the CPU group 0 has the average 75% CPU usage rate and the logical CPU of the CPU group 1 has the average 15% CPU usage rate, the group service time of the CPU group 0 and CPU group 1 becomes 1500 (=2000 milliseconds×75%) and 300 (=2000 milliseconds×15%) (milliseconds) shown in State 2, respectively. Here, when the processing procedures of the service time monitoring unit realized by the service time monitoring process shown in FIGS. 16A, 16B are activated and each group service rate actual measurement value of the CPU groups 0, 1 is calculated according to the calculation formula of FIG. 17, this value becomes 75 for the group 0 and 15 for the group 1.

Since the group service rate actual measurement value 75 of the group 0 is greater than the group service rate 65, Processes 954-959 of FIG. 16A are executed and the group 0 is set to the entry of the physical CPU management table (030) for the physical CPU 4 (005). Thus, the CPU group 0 is allocated to the physical CPU 4 (005), resulting in the CPU group configuration shown in State 3.

With this configuration wherein the number of physical CPUs of the CPU group 0 becomes 3, if the group service rate actual measurement value for the group service time 1500 milliseconds is calculated, the group service rate actual measurement value becomes 50, and can be suppressed to a value lower than the group service rate 65 set in this example.

Since the group service rate actual measurement value 15 of the group 1 is smaller than the group service rate 35, Processes 970-978 of FIG. 16B are executed and the undefined value "−1" is set to the entry of the physical CPU management table (030) for the physical CPU 2 (003). Thus, the physical CPU 2 (003) is released from the CPU group 1, resulting in the CPU group configuration shown in State 4.

With this configuration wherein the number of physical CPUs of the CPU group 1 becomes 1, if the group service rate actual measurement value for the group service time 300 milliseconds is calculated, the group service rate actual measurement value becomes 30, so that the surplus physical CPU can be released while keeping the group service rate lower than 35.

As described above, according to the computer system of this example, paying attention to the group service rate for each CPU group, the group service rate actual measurement value is calculated and compared with the group service rate at each service time monitoring interval so as to determine whether the physical CPU resource of a CPU group is sufficient or insufficient, whereby the allocation of a CPU group to physical CPUs can be dynamically changed and the physical CPU resource can be efficiently utilized.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A virtual computer comprising a plurality of physical CPUs, a plurality of LPARs, and a hypervisor which causes at least one or more logical CPUs constituting the LPAR to share the physical CPUs in a time division manner and thereby allocates the physical CPUs to the logical CPUs, wherein the hypervisor includes:

physical CPU management information for associating a physical CPU number which is an identifier of the physical CPU with a CPU group number which is an identifier of a CPU group allocated to the physical. CPU and holding these information; and LPAR management information for associating an LPAR number indicative of an identifier of the LPAR, a number of logical CPUs constituting the LPAR, and a CPU group number, which is an identifier of the CPU group allocated to the LPAR, to each other and holding these information, wherein the hypervisor, when activating the LPAR, prepares, for the each CPU group, an entry of the logical CPU constituting the LPAR to which the CPU group has been allocated, associates, for the each CPU group, an LPAR number of the LPAR which the logical CPU constitutes, a logical CPU number which is an identifier within the LPAR of the logical CPU, and a state of the logical CPU with each other and manages these information as logical CPU management information, and further the hypervisor, in allocating the physical CPU to the logical CPU, causes the physical CPUs belonging to the same CPU group number to be shared in a time division manner and allocates these physical CPUs to logical CPUs belonging to the same CPU group number.

2. The virtual computer according to claim 1, wherein the hypervisor includes

CPU group management information for associating the CPU group number, a number of the physical CPUs to which the CPU group has been allocated, a number of logical CPUs constituting an LP to which the CPU group has been allocated, an address on a memory for each CPU group of the information managed by the logical CPU management information, a group service rate indicative of a distribution of a use time of a physical CPU which the LPAR uses, the distribution being set in advance for each CPU group, and a group service time indicative of a use time of the physical CPU which an LP within a CPU group has used to each other and holding these information, and wherein a service time monitoring unit, which the hypervisor includes, calculates a group service rate actual measurement value which is a ratio of a group service time for the each CPU group in a total use tune of all the physical CPUs which the virtual computer includes, compares the group service rate actual measurement value with the group service rate to determine whether the physical CPU resource for the each CPU group is sufficient or insufficient, and dynamically changes a CPU group allocated to a physical CPU according to the determined sufficient or insufficient situation.

3. The virtual computer according to claim 2, wherein in the comparison of the group service rate actual measurement value with the group service rate performed by the service time monitoring unit, when the group service rate actual measurement value is greater than the group service rate, the CPU group is allocated to a physical CPU to which the CPU group has not been allocated, when the group service rate actual measurement value is equal to the group service rate, the group service time is set to zero, and when the group service rate actual measurement value is smaller than the group service rate, at least one of the physical CPUs to which the CPU group has been allocated are changed to a CPU group un-allocated state.

4. The virtual computer according to claim 1 wherein the LPAR management information holds an LPAR service time indicative of a sum of physical CPU times which have been allocated to an LPAR.

5. The virtual computer according to claim 1, wherein the process scheduler of the hypervisor refers to the physical CPU management information and obtains an entry of the physical CPU management information, with a physical CPU number of a currently operating physical CPU being as an index, refers to a CPU group number contained in the entry of the obtained physical CPU management information, halts a process when the CPU group number referred to is not defined yet, obtains an entry of the CPU group management information, with the CPU group number referred to being as an index, when the CPU group number referred to is already defined, refers to an address on a memory for each CPU group of information managed by the logical CPU management information contained in the entry of the obtained CPU group management information, refers to a CPU group of the logical CPU management information corresponding to the address referred to, selects, among entries contained in the CPU group of the logical CPU management information referred to, an entry in which a state of the logical CPU is READY, and when the entry has been successful selected, the process scheduler writes a time when a process of activation a logical CPU is executed to an activation start time of the entry of the logical CPU management table, and sets the logical CPU state to RUN and activates the logical CPU.

6. The virtual computer according to claim 1, wherein the logical CPU management information associates a timer value corresponding to a guest program activation start time on the logical CPU with a timer value corresponding to the guest program completion time and manages these information.

7. The virtual computer according to claim 6, wherein in the logical CPU management information, the timer value corresponding to the guest program activation start time on the logical CPU is an activation start time when a timer value, which indicates a time when the logical CPU has been activated, is set, and wherein the timer value corresponding to the guest program completion time is an activation completion time when a timer value is set, which indicates a time when a guest mode in which a physical CPU directly executes an instruction of a guest OS without involvement of a hypervisor transitions to a hypervisor mode and the logical CPU operation is completed.

8. A CPU allocation method in a virtual computer comprising a plurality of physical CPUs, a plurality of LPARs, and a hypervisor which causes at least one or more logical CPUs constituting the LP to share the physical CPUs in a time division manner and thereby allocates the physical CPUs to the logical CPUs, wherein the hypervisor includes:

physical CPU management information for associating a physical CPU number which is an identifier of the physical CPU with a CPU group number which is an identifier of the CPU group allocated to the physical CPU and holding these information; and LPAR management information for associating an LPAR number indicative of an identifier of the LPAR, a number of logical CPUs constituting the LPAR, and a CPU group number, which is an identifier of the CPU group allocated to the LPAR, to each other and holding these information, wherein the hypervisor, when activating the LPAR, prepares, for the each CPU group, an entry of the logical CPU constituting the LPAR to which the CPU group has been allocated, associates, for the each CPU group, an LPAR number of the LPAR which the logical CPU constitutes, a logical CPU number which is an identifier within the LPAR of the logical CPU, and a state of the logical CPU with each other and manages these information as logical CPU management information, and further the hypervisor, in allocating the physical CPU to the logical CPU,
causes the physical CPUs belonging to the same CPU group number to be shared in a time division manner and allocates these physical CPUs to logical CPUs belonging to the same CPU group number.

9. The CPU allocation method according to claim 8, wherein the hypervisor includes
CPU group management information for associating the CPU group number, a number of the physical CPUs to which the CPU group has been allocated, a number of logical CPUs constituting an LPAR to which the CPU group has been allocated, an address on a memory for each CPU group of the information managed by the logical CPU management information, a group service rate indicative of a distribution of a use time of a physical CPU which an LPAR uses, the distribution being set in advance for each CPU group, and a group service time indicative of a use time of a physical CPU which an LPAR within a CPU group has used to each other and managing these information, wherein the hypervisor
calculates a group service rate actual measurement value which is a ratio of a group service time for the each CPU group in a total use time of all the physical CPUs which the virtual computer includes,
compares the group service rate actual measurement value with the group service rate to determine whether the physical CPU resource for the each CPU group is sufficient or insufficient, and
dynamically changes a CPU group allocated to a physical CPU depending on the determined excess or shortage state.

10. The CPU allocation method according to claim 9, wherein in the comparison of the group service rate actual measurement value with the group service rate,
when the group service rate actual measurement value is greater than the group service rate, the CPU group is allocated to a physical CPU to which the CPU group has not been allocated,
when the group service rate actual measurement value is equal to the group service rate, the group service time is set to zero, and
when the group service rate actual measurement value is smaller than the group service rate, at least one of the physical CPUs to which the CPU group has been allocated are changed to a CPU group un-allocated state.

11. The CPU allocation method according to claim 8, wherein the hypervisor
refers to the physical CPU management information,
obtains an entry of the physical CPU management information, with a physical CPU number of a physical CPU currently operating being as an index,
refers to a CPU group number contained in the entry of the obtained physical CPU management information,
halts a process when the CPU group number referred to is not defined yet,
obtains an entry of the CPU group management information, with the CPU group number referred to being as an index, when the CPU group number referred to is already defined, and further the hypervisor
refers to an address on a memory for each CPU group of information managed by the logical CPU management information contained in the entry of the obtained CPU group management information,
refers to a CPU group of the logical CPU management information corresponding to the address referred to,
selects, among entries contained in the CPU group of the logical CPU management information referred to, an entry in which a state of the logical CPU is READY, and
when the entry has been successfully selected, the process scheduler writes a time when an activation process of a logical CPU is executed to an activation start time of the entry of the logical CPU management table, and sets the logical CPU state to RUN and activates the logical CPU.

12. The CPU allocation method according to claim 8, wherein when a physical CPU is allocated to a logical CPU and a guest program is operated on the logical CPU, a timer value corresponding to a guest program activation time is set to a logical CPU management table, and wherein
when an interrupt occurs in the allocated physical CPU and an operation of the guest program is halted and a control transitions to a hypervisor,
a timer value corresponding to a logical CPU completion time is set to the logical CPU management table, and
(completion time-start time) is added to a group service time of a CPU group currently allocated to an LPAR to which the relevant logical CPU belongs.

* * * * *